United States Patent
Schulze et al.

(10) Patent No.: US 7,221,788 B2
(45) Date of Patent: May 22, 2007

(54) METHOD OF INSPECTING A MASK OR RETICLE FOR DETECTING A DEFECT, AND MASK OR RETICLE INSPECTION SYSTEM

(75) Inventors: Steffen Schulze, Sherwood, OR (US); Henning Haffner, Dresden (DE)

(73) Assignee: Infineon Technologies AG, München (DE)

( * ) Notice: Subject to any disclaimer, the term of this patent is extended or adjusted under 35 U.S.C. 154(b) by 751 days.

(21) Appl. No.: 10/611,067

(22) Filed: Jul. 1, 2003

(65) Prior Publication Data

US 2005/0002554 A1    Jan. 6, 2005

(51) Int. Cl.
*G06K 9/00* (2006.01)
(52) U.S. Cl. .................. 382/144; 382/145; 430/5; 430/30; 356/237.5
(58) Field of Classification Search .............. 382/144, 382/145, 149, 154; 430/4, 5, 30, 319; 356/237.1, 356/73, 237.5, 237.4; 250/310, 307, 397, 250/559.09, 559.45, 306
See application file for complete search history.

(56) References Cited

U.S. PATENT DOCUMENTS

| | | | |
|---|---|---|---|
| 4,559,603 A | 12/1985 | Yoshikawa | |
| 4,641,353 A | 2/1987 | Kobayashi | |
| 5,046,109 A | 9/1991 | Fujimori et al. | |
| 5,790,251 A | 8/1998 | Hagiwara | |
| 5,838,433 A | 11/1998 | Hagiwara | |
| 5,965,306 A * | 10/1999 | Mansfield et al. | 430/22 |
| 6,190,836 B1 * | 2/2001 | Grenon et al. | 430/311 |
| 6,198,529 B1 * | 3/2001 | Clark et al. | 356/237.5 |
| 6,222,936 B1 * | 4/2001 | Phan et al. | 382/149 |
| 6,297,879 B1 * | 10/2001 | Yang et al. | 356/237.5 |
| 6,363,296 B1 * | 3/2002 | Schulze | 700/125 |
| 6,466,314 B1 * | 10/2002 | Lehman | 356/237.1 |
| 6,611,953 B1 * | 8/2003 | Filseth et al. | 716/19 |
| 6,651,197 B1 * | 11/2003 | Wildes et al. | 714/726 |
| 6,873,720 B2 * | 3/2005 | Cai et al. | 382/149 |
| 6,925,202 B2 * | 8/2005 | Karklin et al. | 382/145 |
| 7,079,235 B2 * | 7/2006 | Lehman | 356/237.1 |

* cited by examiner

*Primary Examiner*—Sheela Chawan
(74) *Attorney, Agent, or Firm*—Laurence A. Greenberg; Werner H. Stemer; Ralph E. Locher

(57) ABSTRACT

A method of inspecting a mask or reticle, the mask or reticle being provided with a pattern to be transferred onto a semiconductor wafer, the pattern having a defect, includes the step of creating a plurality of logical zones and uniquely associating each of said logical zones with a surface area of said pattern. Then, an inspection rule representing a characteristic sensitivity for detecting a defect is associated with each of said logical zones. An image of said pattern is then recorded and compared with a reference image of an ideal pattern for locating a defect within said pattern. One of said logical zones is then identified with said located defect and that inspection rule which is associated with said identified logical zone is retrieved from a memory. The inspection rule is then applied to a characteristic of said defect for determining, whether said defect is to be repaired. A signal can be issued in response to said determination.

10 Claims, 8 Drawing Sheets

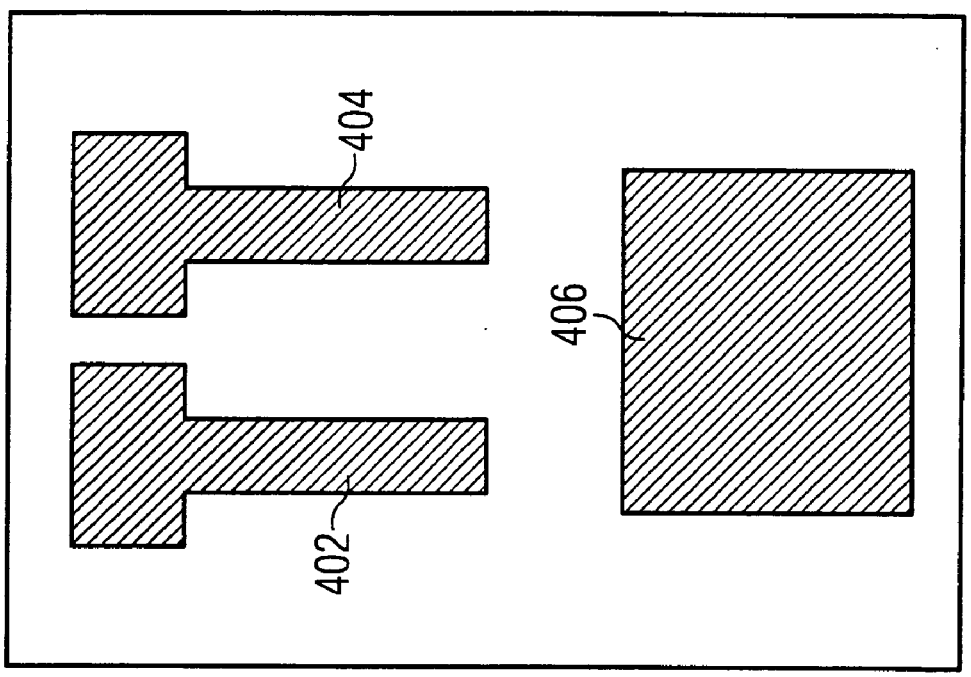
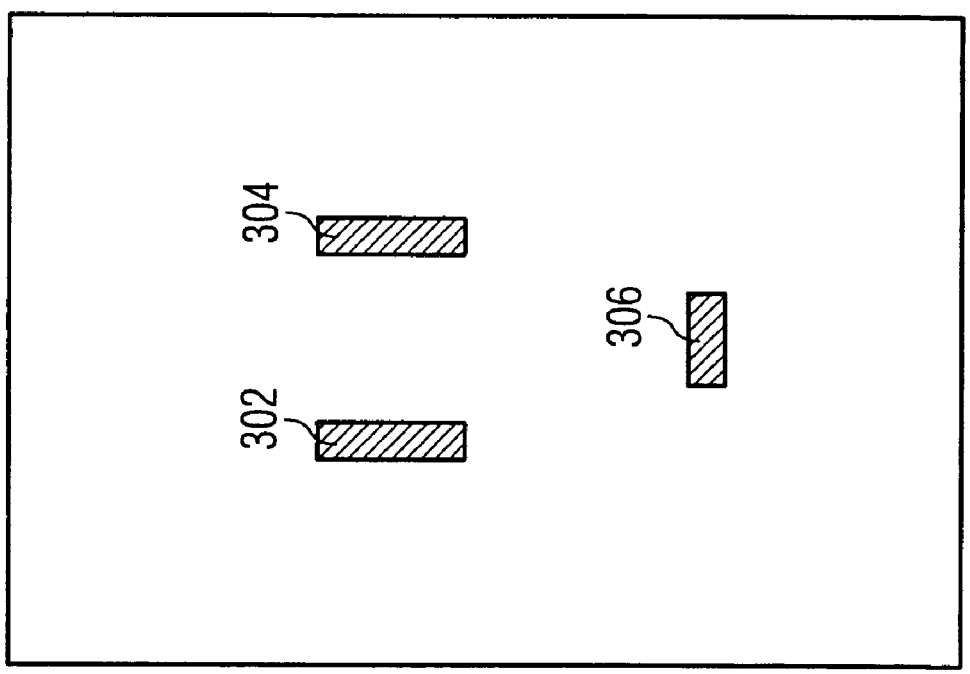

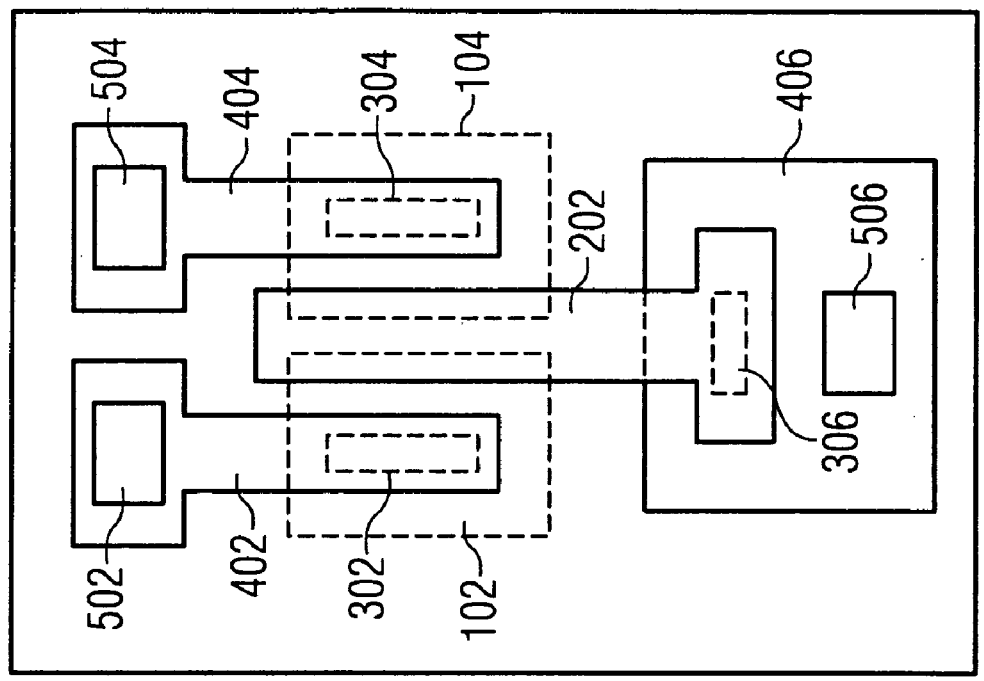
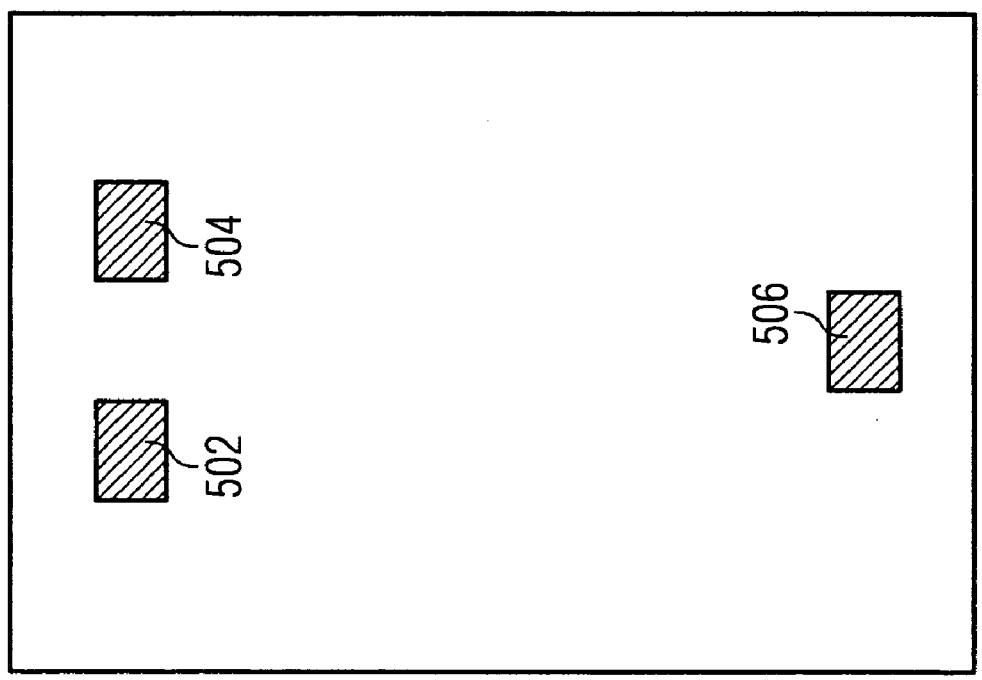

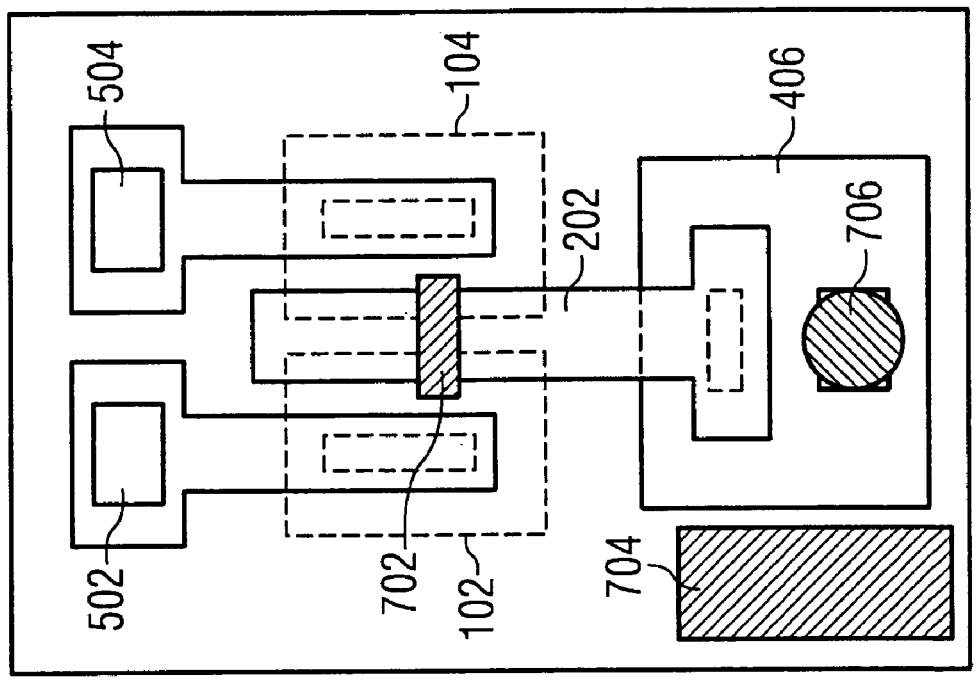
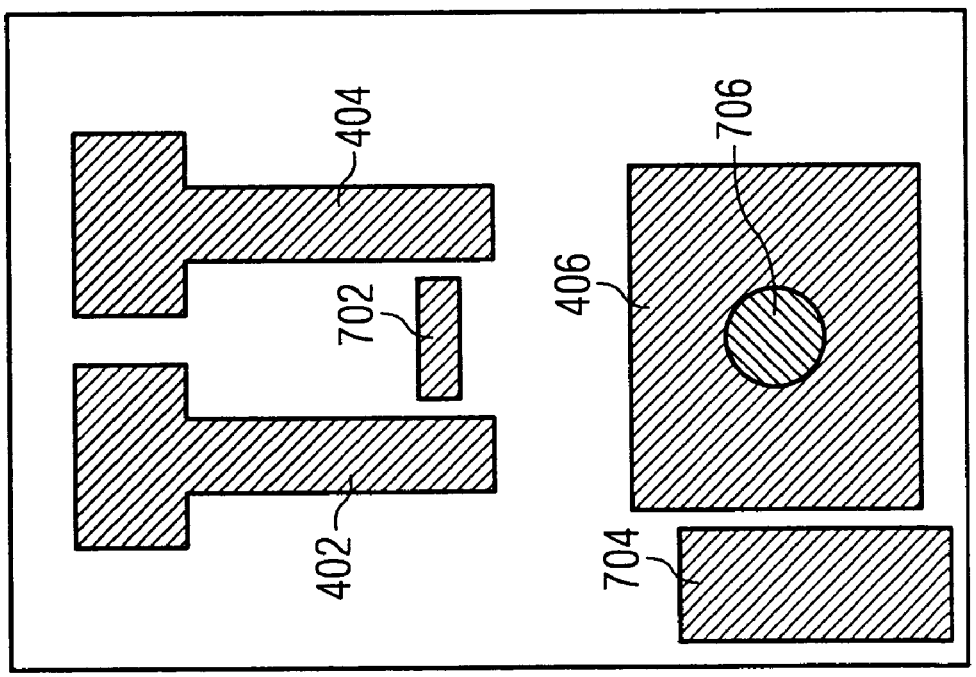

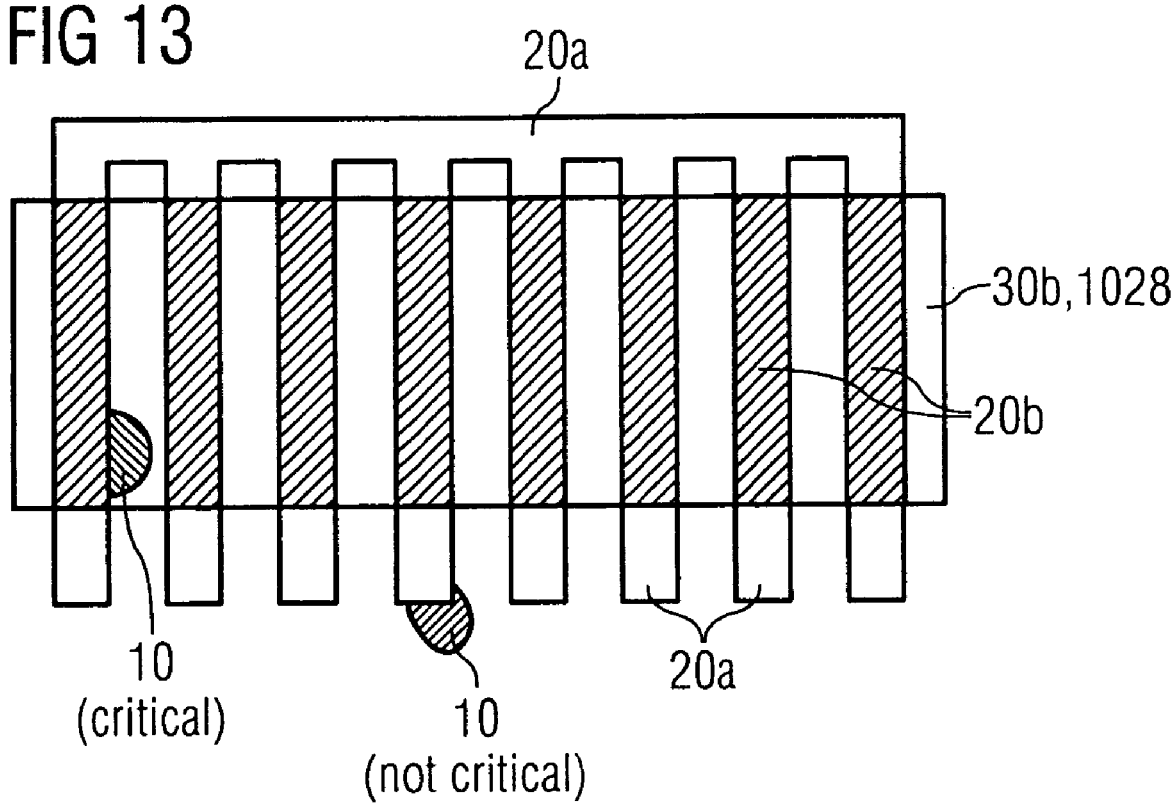

METHOD OF INSPECTING A MASK OR RETICLE FOR DETECTING A DEFECT, AND MASK OR RETICLE INSPECTION SYSTEM

BACKGROUND OF THE INVENTION

FIELD OF THE INVENTION

The present invention relates to a method of inspecting a mask or reticle for detecting a defect, and more particularly to an automated method of inspecting a mask or reticle that uses defect inspection rules to identify a defect on a mask or reticle.

In photomask manufacturing the inspection of masks or reticles for detecting defects and the subsequent repair of these masks is one of the most critical issues in order to retain an optimum quality or a highest yield in integrated circuit production. Defects often occur as additional light shielding or light transmitting regions on a mask as compared with an ideal pattern provided by a pattern layout or design.

For example, in case of structuring a contact array on a semiconductor wafer by means of transferring a corresponding pattern from a mask onto the wafer a defect represented by an additional light transmitting region in case of employing a positive resist between two neighboring contact hole patterns could lead to a short between both contacts in a resulting electrical circuit.

Accordingly, tolerance ranges are usually provided representing a maximum allowed size or extent of a defect within a pattern on a mask, that guarantees an electrical functionality of a circuit.

Defect inspection can commonly be carried out by two different methods: as a die-to-die inspection or as a die-to-database inspection. In both cases an optical—typically i-line—image is taken of a pattern formed on a mask. Deep-UV-inspection tools are under development and will be available in the future. E.g., in case of the mask being a reticle a first pattern image can be compared with an image which is taken from another pattern formed on the same reticle (die-to-die-inspection). In this document the second image is referred to as a reference pattern image.

In the alternative method, a pattern is taken from a database, i.e. design layout information, and then compared with the image of the pattern actually structured on the mask. In this case the design layout information is adapted to the inspection tool conditions by means of image processing, i.e., regarding optical resolution of the inspection tool, etc.

In order to detect a defect the comparison of both images involves aligning both images using an optimization algorithm when overlaying both images. Usually, an efficient convolution algorithm is employed to identify locations in both images, that correspond to each other.

Once both images are aligned with each other, each pattern information relating to the actually structured pattern and the "ideal" reference pattern can be compared. Typically, an optical inspection involves transmitting or reflecting light through/from the pattern, which is then recorded as an intensity information as a function of location within an image area of the pattern. Accordingly, the comparison between both images leads to a difference image, whereby intensities recorded or measured at corresponding locations within each of the patterns are subtracted from each other to give residual intensities. Large values of residual intensities result from locations, where there is few coincidence between both images. Those locations maybe identified with possible defects.

Intensity threshold values, which are determined previously, e.g., by experience, are then applied to the image to each location/pixel of the difference image in order to locate a defect. Where a calculated residual intensity exceeds such a threshold value, the probability of a defect is particularly large. These locations are then marked for review.

Subsequently, an operator may once more visualize a corresponding location in order to characterize or classify the defect. Optionally, a protocol is generated by the operator that provides information for finding the cause of the defect. At selected locations within the pattern corresponding to defects an appropriate repair step may then be performed by depositing light shielding material at the location of the defect using a laser, or by removing light shielding material, in case a repair is determined to be necessary.

In the case of phase shift masks phase defects in an additional MoSi-layer or in a Quartz-material of the mask substrate may occur, which is even harder to inspect. However, a repair of these defects has also become possible.

In many applications such as dynamical random access memories (DRAM) some mask levels out of a common mask set comprise high density patterns. In the case of DRAMs examples are provided by patterns corresponding to deep trench levels, active area levels, gate conductor levels, contact area levels, etc. In these cases tight tolerance ranges are specified for the size of defects. However, the corresponding mask patterns also comprise large peripheral fields, which are to be inspected using that tight tolerance specification. Accordingly, an inspection of a mask level comprising even a small but highly integrated mask pattern requires long tool time and therefore unnecessarily increases the costs for manufacturing a photomask.

Descriptions to approaches for inspecting photomasks include U.S. Pat. No. 4,559,603 issued Dec. 17, 1985 to Yoshikawa, U.S. Pat. No. 4,641,353 to Kobayashi on Feb. 3, 1987, U.S. Pat. No. 5,046,109 issued Sep. 3, 1991 to Fujimori, et al., U.S. Pat. No. 5,790,251 issued Aug. 4, 1998 to Hagiwara, U.S. Pat. No. 5,838,433 issued Nov. 17, 1998 to Hagiwara, U.S. Pat. No. 5,965,306 issued Oct. 12, 1999 to Mansfield, et al., U.S. Pat. No. 6,297,879 issued Oct. 2, 2001 to Yang, et al.

Photomask defect inspection systems available from KLA-Tencor, Orbot, and Lasertec operate in manners similar to the above disclosures, in that these systems normally consist of a high magnification and high resolution imaging system, where a photomask is scanned pixel by pixel. After the automatic inspection of the photomasks, the operator evaluates each defect found via the automatic inspection in order to classify whether the indication of a defect is false or real.

In operation, whether a particular defect is actually critical depends not only on the size of the defect, but also on the proximity of the defect to features on the photomask.

Additionally, a defect may be critical because of its proximity to a feature on another photomask of the set. For example, a defect located within an area on a current mask level that does merely contain any structural features may cause a short circuit between features generated on neighboring layers on a wafer corresponding to mask levels above or below the current mask.

SUMMARY OF THE INVENTION

It is an object of the present invention to increase the throughput of photomasks or reticles during the process steps of inspection.

It is a further object of the invention to increase the yield in photomask manufacturing.

It is a further object of the invention to reduce efforts spent in repairing a mask or reticle in order to retain a functionality of an electrical circuit that results from a lithographic pattern transfer using the current mask level.

These and other objects are solved by a method of inspecting a mask or reticle, the mask or reticle being provided with a pattern to be transferred onto a semiconductor wafer, and the pattern comprising a defect. The method comprises the following method steps:

creating a plurality of logical zones and uniquely associating each of the logical zones with a surface area of the pattern;

associating an inspection rule representing a characteristic sensitivity for detecting a defect with each of the logical zones;

recording an image of the pattern to form a recorded image;

comparing the recorded image with a reference image of an ideal pattern for locating a defect within the pattern;

identifying one of the logical zones with the defect located in the locating step;

retrieving the inspection rule that is associated with the identified logical zone;

applying the inspection rule to a characteristic of the defect for determining whether or not the defect is to be repaired; and issuing a signal in response to the determination.

The objects are also solved by a similar method of inspecting a mask or reticle, the mask or reticle being provided with a pattern to be transferred into one of a plurality of material layers on a semiconductor wafer, the pattern comprising a defect. That method comprises the steps of:

creating a plurality of inspection rules representing a characteristic sensitivity for detecting a defect;

recording an image of the pattern;

comparing the recorded image with a reference image of an ideal pattern for locating a defect within the pattern;

providing at least a second pattern, which corresponds to a further mask level of the set of masks or reticles, comparing the pattern comprising the defect to the second pattern, selecting one of the created inspection rules and associating the inspection rule the located defect in dependence of the comparison;

applying the inspection rule to a characteristic of the defect within the pattern for determining, whether the defect is to be repaired; and issuing a signal in response to the determination.

With the above and other objects in view there is also provided, in accordance with the invention, a mask or reticle inspection system, comprising:

a memory device for storing a reference image of a pattern provided with a mask or reticle, a plurality of logical zones, and an inspection rule associated with each of the logical zones, wherein each logical zone represents an area of the pattern;

an image capture device coupled to said memory device and configured to record an image of the pattern and store the image in said memory device; and a processor coupled to said memory device and configured to compare the image of the pattern to the reference image of the pattern, to locate a defect within the pattern, to apply an inspection rule associated with the logical zone that is identified with the defect to a characteristic of the defect for determining whether or not the defect is critical, and to issue a signal in furtherance of applying the inspection rule.

Finally, there is also provided, in accordance with the invention, a mask or reticle inspection system that comprises:

a memory device adapted to store a reference image of a pattern provided with a mask or reticle, a plurality of inspection rules, and an electronic data representation of the pattern and at least one second pattern;

an image capture device coupled to said memory and adapted to record an image of the pattern and store the image in said memory; and a processor coupled to said memory and adapted to compare the image of the pattern to the reference image of the pattern, locate a defect within said pattern, to compare the pattern with the at least one second pattern, to select and apply an inspection rule selected in response to the comparison of the patterns to a characteristic of the defect for determining whether or not the defect is critical, and to issue a signal in furtherance of applying the inspection rule.

Using the method of the present invention, different inspection rules that are dependent on local requirements of the pattern to be inspected are applied to the same mask level. An inspection rule represents a characteristic sensitivity for detecting a defect within a surface area of a pattern of structural features provided with a mask or reticle. An inspection rule may, for example, comprise at least a pair of: a minimum or maximum allowed threshold value for a characteristic—or quantity—of a defect and a function or method that effects a calculation and/or comparison of an actually measured characteristic together with the allowed value of the pattern.

According to a preferred embodiment a defect sensitivity is accomplished by adjusting the pixel size as a function of location across the mask or reticle. Enlarging the pixel size—expressed in terms of a length scale on the mask or reticle—may reduce the light shielding or transmitting contribution of a defect to the integrated light of a surface area on the mask. At a given intensity threshold a larger pixel (or reduced image resolution) size therefore reduces the defect sensitivity. In this embodiment, the inspection rule comprises, e.g., a pixel size, an intensity threshold level, etc.

According to another preferred embodiment a tighter intensity threshold value, i.e. a smaller intensity threshold value, can be applied to regions within the pattern, which are highly integrated, while more relaxed threshold values, i.e. larger intensity threshold values, can be applied to regions within the pattern, which would suffer in electrical functionality only if very large defects would occur.

Since the tight specifications for defect inspection sensitivity are applied in a highly integrated design while larger defects are accepted, e.g., in the peripheral regions of a pattern, time for repair of masks can be saved. Further, an inspection of a mask level maybe performed in a reduced time scale, since the resolution of image processing can be relaxed, when larger threshold values are applied. A coarse estimation of the inspection time needed for a critical layer gives a possible time reduction of 20–30%, when relaxed specifications are applied to peripheral or pattern fill structures having no functional (electrical) meaning.

The method of the invention can be applied to any type of inspection tool, e.g. optical, scanning electron microscope, atomic microscope, etc. It is also irrespective of the kind of inspection, i.e. a die-to-die inspection is possible as well as a die-to-database-inspection. A mask-to-mask-inspection is applicable as well.

The invention is not limited to the case of light intensities. The term "intensity" used throughout this document refers to any pixelwise image information about a pattern formed on a mask. For example, height information, electron emissivity, electron density, reflectivity, transmissivity or any other local physical characteristic of a mask pattern are included within this term "intensity."

The invention is also not restricted to an application of full pattern images, it can also be applied to interesting portions of a pattern, where a diversification of defect sensitivities according to the invention is desired.

In a most preferred aspect of the present invention the locally differing intensity threshold values are provided by determining sensitivity requirements of the current layer by means of a comparison of the current layer with the pattern of another mask level belonging to the same common mask set. The sensitivity characteristic thereby depends on the electrical properties of an electrical component that is locally to be formed on a semiconductor wafer. The requirements are adapted to a tolerance range specified locally for the corresponding electrical components.

Another aspect of the invention refers to requirements set up from the same layer: for example, simple fill shapes provided with the pattern serve to improve a chemical-mechanical polishing or an etch step process. The lithographic process may be improved as well. Electrical properties of corresponding electrical components thus do not suffer from defects at all. Consequently, the present method can be applied with a second inspection rule in these areas representing a different defect sensitivity requirement with a considerably relaxed specification, e.g. a very large intensity threshold value or pixel size etc. within those simple fill shape areas.

According to a preferred embodiment a plurality of logical zones are set up each zone representing a surface area of the pattern. The different inspection rules are associated with each of the zones. The mask surface is at least in parts covered by an idealized inspection rule map. Once a defect is located or assumed to hypothetically take a position within the pattern on the mask, a corresponding zone can be identified by comparing the defect position with the surface areas associated with the zones. Consequently, the inspection rule connected with the zone can be automatically derived.

Other features which are considered as characteristic for the invention are set forth in the appended claims.

Although the invention is illustrated and described herein as embodied in a method of inspecting a mask or reticle for detecting a defect and an associated inspection system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a plan view of a contact photomask for a silicon gate transistor;

FIG. 4 is a plan view of a metal photomask for a silicon gate transistor;

FIG. 5 is a plan view of a pad photomask for a silicon gate transistor;

FIG. 6 is a diagrammatic plan view illustrating the relationships between the photomasks of FIGS. 1–5;

FIG. 7 is a plan view of a metal photomask for a silicon gate transistor having defects;

FIG. 8 is a diagrammatic plan view showing the relationships between the photomasks of FIGS. 1–3, 5 and 7;

FIG. 13, same as FIG. 2, is a plan view for a gate conductor pattern of a first mask level overplotted with an active area shape of a second mask level.

DESCRIPTION OF THE PREFERRED EMBODIMENTS

The invention described herein involves quality control of photomasks, or masks, used in the patterning phase of integrated circuit wafer fabrication. Patterning is accomplished by photolithography, which may sometimes be referred to as photomasking, masking, oxide removal or metal removal. In particular, the invention described herein involves the inspection of photomasks or reticles for defects. In what follows the term photomask relates to masks as well as recticles.

There are many methods of patterning with photomasks. For simplicity, however, photomasks shown in FIGS. 1–10 are clear-field. All of the features shown on these masks result in either "islands" or doped regions on the resulting wafer, and it can be assumed that negative or positive photoresist is utilized as required to achieve this result. The invention claimed herein will work equally well with clear or dark field masks, and negative or positive photoresists. In particular, contacts such as those that will be described in further embodiments shown in FIGS. 12 or 13 are typically formed by means of dark field masks.

In order to describe the invention without burdening the reader with the complexities involved in wafer fabrication, the following illustrative embodiment is described for use with a set of masks for producing a simple gate transistor. This mask set includes five masks, and has fewer than twenty total features. Nevertheless, the invention disclosed herein is equally suited for all types of wafer fabrication using photomasks, including the fabrication of memories, processors, amplifiers, and other logic or analog circuits, and nothing in this disclosure should be read to limit the claimed invention.

In FIGS. 1–10 a simple example of a mask set for forming a silicon gate transistor is shown to illustrate the concept of logical zones as created according to one aspect of the invention. Process steps relating to providing a substrate, spinning on resist layers, depositing, planarizing, etching, doping, removing, sputtering, tempering layers etc., cleaning steps are not illustrated in the Figures. However, it is pertinent to a person skilled in the art, that such steps are to be carried between performing lithographic patterning steps using photomasks, although not explicitly stated.

Figure 1:
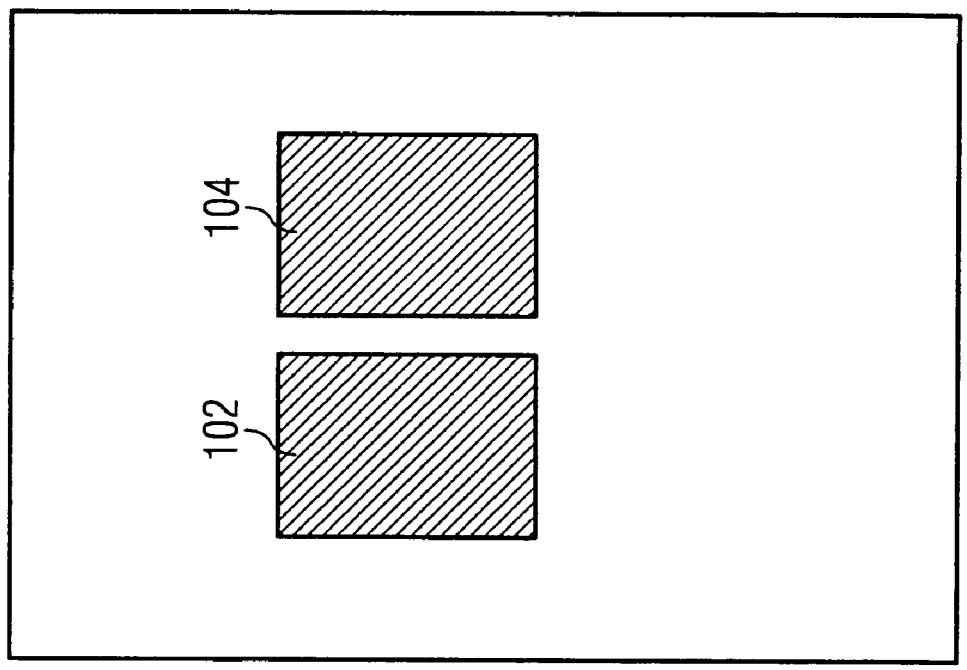
FIG. 1 is a plan view of a well photomask for a silicon gate transistor.

Referring now to the figures of the drawing in detail and first, particularly, to FIG. 1 thereof, there is shown a well photomask 100 for a silicon gate transistor. The mask 100 includes features 102 and 104. In a first patterning process, features 102 and 104 create two N-type doped regions (wells) in the surface of a P-type wafer.

Figure 2:
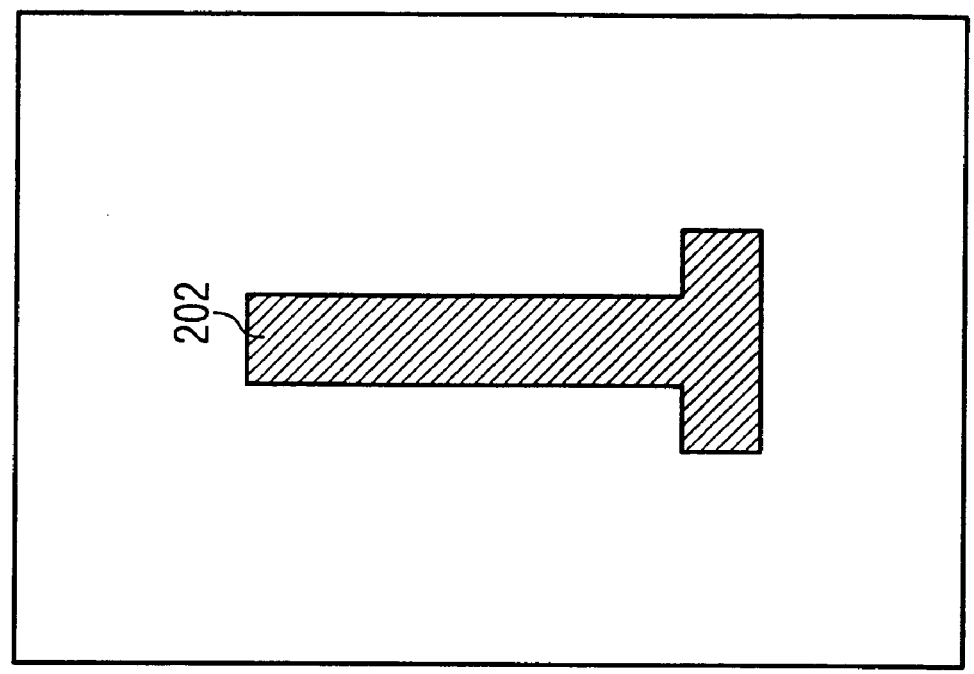
FIG. 2 is a plan view of a gate photomask for a silicon gate transistor.

Referring to FIG. 2, a gate photomask 200 for the silicon gate transistor is shown. Mask 200 includes feature 202. In a second patterning process, feature 202 creates a gate that bridges the wells formed by features 102 and 104. Thus, the P-type wafer substrate, the wells formed by features 102 and 104, and the gate formed by feature 202 create a simple silicon gate transistor. However, at this point in the patterning process, the transistor has no conductors associated with it to which other circuit elements may connect.

Referring to FIG. 3, a contact photomask 300 for the silicon gate transistor is shown. Mask 300 includes features 302, 304, and 306. In a third patterning process, features 302 and 304 create contact regions (contacts) between a metal layer (shown in FIG. 4) and the wells formed by features 102 and 104. Additionally, feature 306 creates a contact between the metal layer (shown in FIG. 4) and the gate formed by feature 202.

Referring to FIG. 4, a metal photomask 400 for the silicon gate transistor is shown. Mask 400 includes features 402, 404, and 406. In a fourth patterning process, features 402, 404, and 406 create conductors (metal paths) between the contacts formed by photomask 300 and pads formed by photomask 500 (shown in FIG. 5).

Referring to FIG. 5, a pad photomask 500 for the silicon gate transistor is shown. Mask 500 includes features 502, 504, and 506. In a fifth patterning process, features 502, 504, and 506 create pads on top of the conductors formed by photomask 400. These pads may be formed from gold, and are the point of attachment for the wires that connect the transistor to external package leads.

Referring to FIG. 6, the alignment of the photomasks 100, 200, 300, 400, and 500 is shown. While this juxtaposition of a mask set for a single transistor is somewhat complex to view, it is vastly less complicated than a photomask set for a microprocessor, a memory, or even a simple transistor-transistor-logic (TTL) quad-nand gate, which is generally considered to be the least complex integrated logic circuit. Memory circuits currently available may have a billion or more transistors, and are created from masks sets in the same basic fashion described above.

Turning to FIG. 7, the metal photomask 400 from FIG. 4 is again shown. Unlike in FIG. 4, however, in FIG. 7 the mask 400 includes defects 702, 704, and 706. Defects 702 and 704 are opaque regions in areas of the mask that should be clear. Defect 706 is a clear region in an area of the mask that should be opaque. In a defect report merely screening mask 400 for defects according to size, defects 702 and 706 may be below the resolution of "critical" defects. Likewise, defect 704, which is relatively large, may be flagged as a critical defect, requiring costly repair.

Turning to FIG. 8, the alignment of the photomasks 100, 200, 300, and 500 is shown with the defective metal photomask 400 from FIG. 7. As can be seen, relatively small defect 702 will create a conductive metal path between the wells formed on the wafer by means of features 102 and 104, and across the gate that bridges these wells. The fact that this defect is critical is easy to ascertain when the location of features on photomasks 100 and 200 are known. Likewise, relatively small defect 706 will substantially prevent the pad formed by feature 506 from contacting with the conductive metal path formed by feature 406. Determining that defect 706 is critical is greatly simplified by examining the location of features on photomask 500. It may even happen, that a defect occurring on a mask does not connect the critical features, while the result of the defect as projected onto a wafer connects the corresponding metal paths.

Furthermore, relatively large defect 704, which is relatively close to feature 406, may appear to be a critical defect if only mask 400 is considered. As shown in FIG. 8, however, defect 704 will not affect the functionality of a die created from the mask set. Even if defect 704 were in contact with feature 406, a transistor created from the mask set would function normally. The fact that relatively large defect 704 is not critical is simple to determine when the mask set is viewed as a whole.

Commercially available photomask inspection systems generally allow the operator to select a single sensitivity level for inspecting an entire photomask. This sensitivity level determines the minimum size of defects that will be reported by the system. At a high sensitivity level, small defects are reported by the system. At a low sensitivity level, only larger defects are reported. Because a high sensitivity level inspection requires more processing, it also takes more time to complete than a low sensitivity level.

Photomask inspection systems are generally manned by skilled technicians, or operators, who receive training on the use of the system and also the basics of the fabrication process. These operators are able to determine whether some defects are critical, and thus require repair. Often, however, an operator must enlist the help of an engineer to determine whether a defect is critical.

Figure 9:
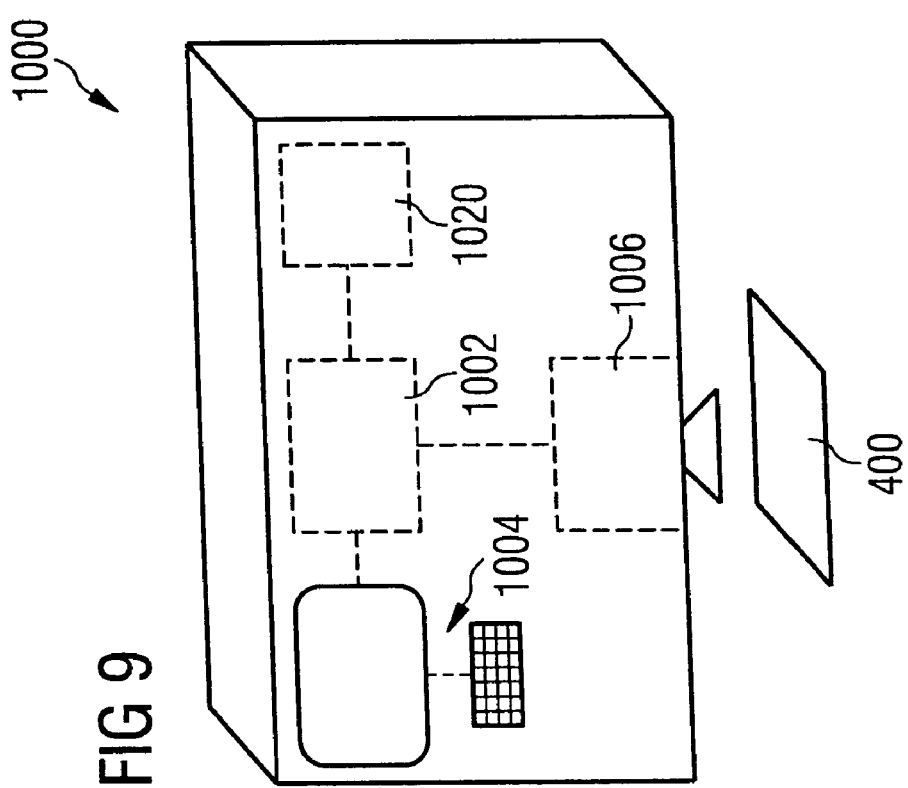
FIG. 9 is a block diagram of a photomask inspection system.

A photomask inspection system 1000 is shown in FIG. 9. Photomask inspection system 1000 includes processor 1002, a user interface 1004, an image capture component 1006, and a memory 1020. The processor 1002 may control the overall operation of the photomask inspection system 1000. The processor 1002 may include a microprocessor or a microcontroller, such as an Intel Pentium microprocessor, a Sun SPARC microprocessor, a Motorola microprocessor, or the like. Although shown as integrated with the other components of the photomask inspection system 1000, the processor 1002 may be physically separate therefrom.

The user interface 1004 may be either a physical terminal, or an interface capable of receiving input and providing visual and/or audio output. The user interface 1004 may be either directly connected to the other components of the photomask inspection system 1000, or the user interface 1004 may communicate with the photomask inspection system 1000 via a network. In a preferred embodiment the user interface 1004 includes at least a keyboard and a display, as shown in FIG. 9. The user interface 1004 may also be a logical interface, such as a graphical window, accessed through a remote terminal having at least a keyboard and a display.

The image capture component 1006 may acquire and digitize an image of a photomask. In FIG. 9, the photomask 400 is included for illustration, and should not be considered a limitation of the system. The image capture component 1006 may include one or more electromagnetic sensors, such as a camera or a scanner, as well as hardware and software for converting received electromagnetic waves into a digital image. The image capture component 1006 may include an illumination source. Alternatively, the image capture component 1006 may include a high resolution microscope, such as a scanning electron microscope or an optical microscope.

The memory 1020 may store photomask inspection rules and photomask reference images. The memory 1020 may also store operational software for controlling the operation of the photomask inspection system 1000. The memory 1020 may include a nonvolatile storage medium such as a hard disk, a compact disc, a digital versatile disc, a minidisk drive, a floppy disk drive, a smart card, a memory stick, a memory cartridge, a flash memory, or the like. The memory 1020 may also include a volatile storage medium, such as a random access memory (RAM).

The operation of one embodiment of the photomask inspection system 1000 will now be discussed in reference to FIG. 10. First, the metal photomask 400 is divided into logical zones 1022, 1024 and 1026. Each of these logical zones 1022, 1024 and 1026 is associated with a set of rules for inspecting the respective zone. In the most basic case, the rule may be a size sensitivity setting relating to the minimum size of defects to be reported.

Figure 10:
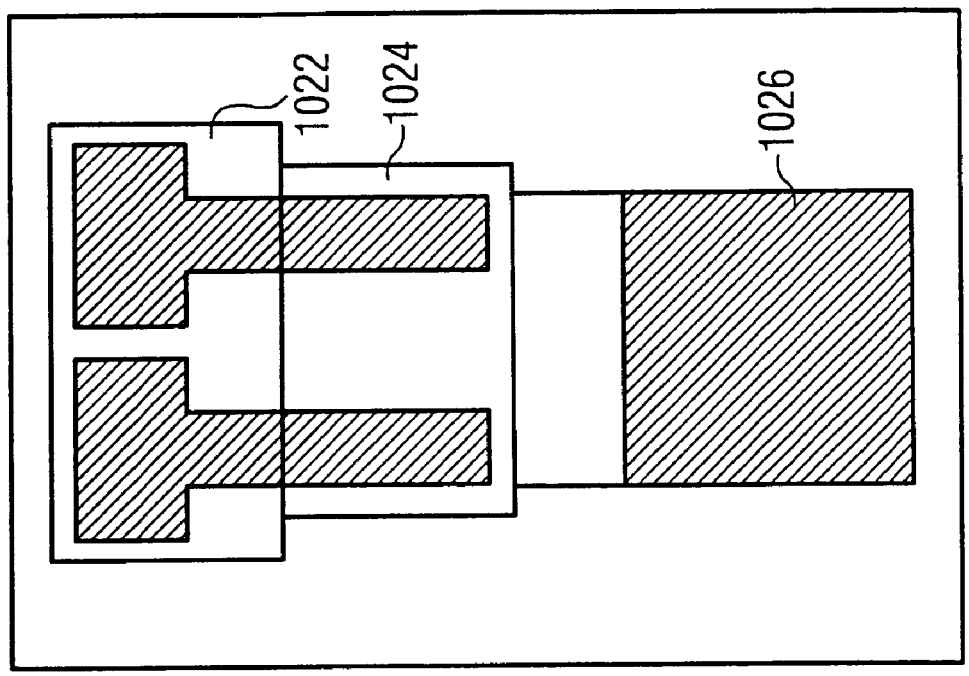
FIG. 10 is a metal photomask for a silicon gate transistor having defect sensitivity zones.

As shown in FIG. 10, zone 1024 includes the area where features 102 and 104 reside. Because features 102 and 104 create two N-type doped wells in the resulting die, defects in the metal layer in zone 1024 may be critical. Therefore, the engineer may assign a high sensitivity size rule to zone 1024, so that relatively small defects in the zone 1024 will be reported by the photomask inspection system 1000.

Using similar reasoning, the engineer may decide to assign a relatively high sensitivity size rule to zone 1024, where the pads formed by features 502 and 504 will reside in the die. The zone 1026, where the pad formed by feature 506 will reside, may be assigned mid-level sensitivity size rule. As shown in FIG. 8, the areas outside of the zones 1022, 1024 and 1026 contain no features on any photomask of the set. Therefore, the default rule for the remaining area may be assigned a relatively low sensitivity size setting. In fact, for the photomask 400, the remaining area may not need to be inspected at all.

These logical zones 1022, 1024 and 1026 and their associated rules are then stored in the memory 1020, illustratively by being entered via the user interface 1004. A photomask reference image for photomask 400 is also stored in the memory 1020.

Figure 11:
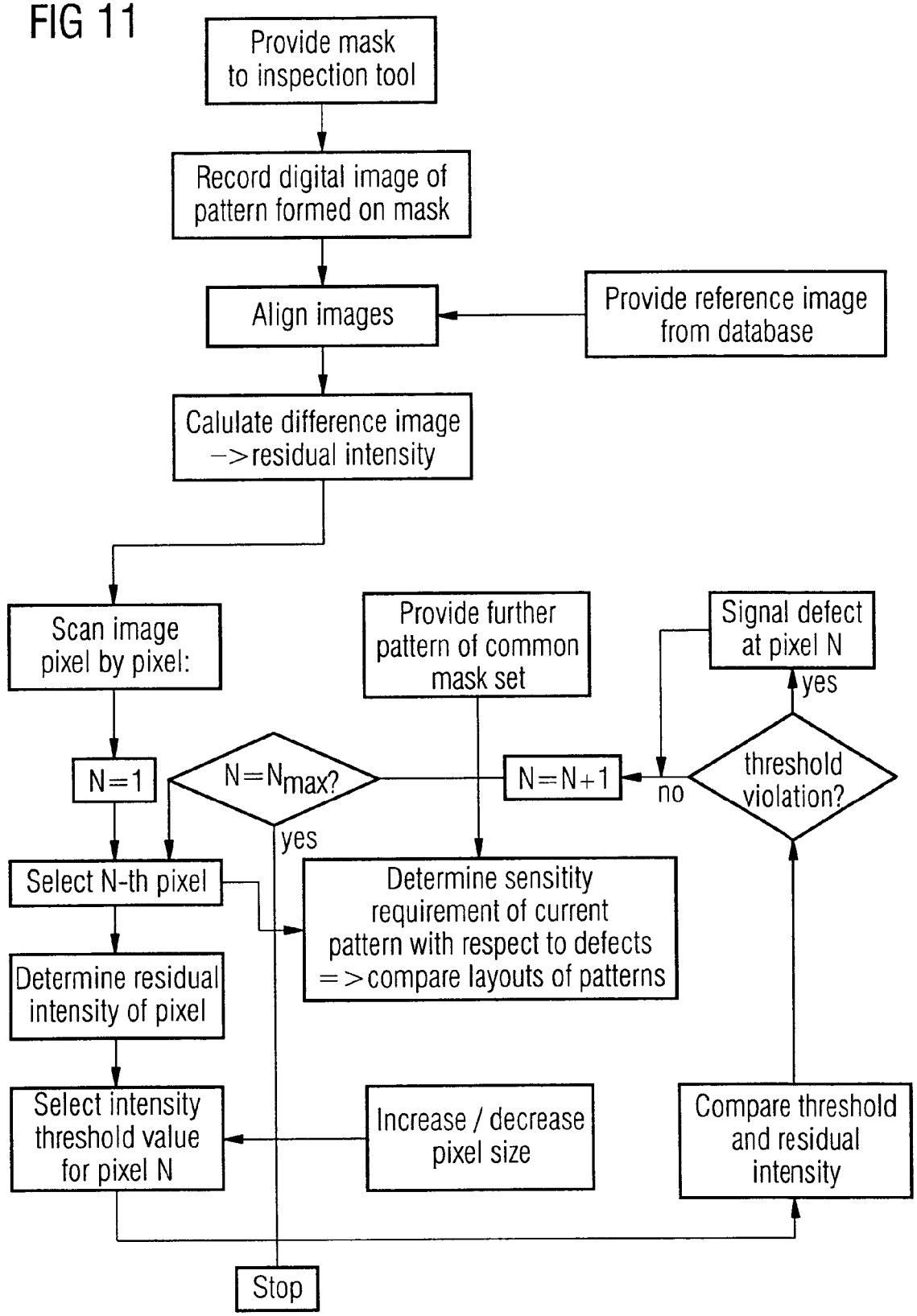
FIG. 11 shows a flow chart of an embodiment of the present invention.

FIG. 11 displays a flow chart of an embodiment of the method of the present invention. A mask comprising a pattern that is to be transferred into a layer of a semiconductor wafer is provided to an inspection tool. The inspection tool used here is an i-line-inspection tool, that usually works in a transmission mode, i.e., light shielding regions are identified by absorption of light, such that the corresponding structural features are recorded in an image with a reduced intensity.

To record an image of the pattern formed on the mask, the mask is irradiated with light from one side and an image of the light transmitted through the mask is recorded using a sensor mounted on the other side. A lens projection system is used to yield a sharp image.

The pattern that is formed on the mask originates from a design or layout pattern, that previously was used as input, e.g., for an electron beam writer, which transferred the design layout pattern into a photo sensitive resist arranged on a light shielding layer, which is formed on a glass substrate. While the mask is processed in subsequent steps to transfer the pattern into the light shielding layer, the design or layout pattern is now provided as a reference image from a database in order to be compared with the image taken from the actually structured pattern on the mask. Some kind of image processing may have been applied to the database pattern in order to retrieve a comparable image.

Both images are aligned with each other in order to identify locations within both images corresponding to each other. An optimization procedure maybe employed to achieve this, e.g. a convolution scheme.

In the digital images recorded according to this embodiment locations in both images are identified as corresponding image pixels. A difference image is calculated by subtracting the intensities of both images pixel by pixel. The difference image therefore comprises a matrix of pixels each being provided with a residual intensity.

This difference image is then scanned pixel by pixel in order to detect intensity peaks, which are suspicious of representing a defect.

A further pattern of another mask level is also provided. For each pixel being scanned a sensitivity requirement is determined from the second pattern as described below. For this purpose the pattern layout data are compared. The pixel size is adjusted according to the needs with respect to sensitivity.

For each image pixel the corresponding residual intensity is read out and then compared with an intensity threshold value, that is individually predetermined for the current pixel.

Figure 12A:
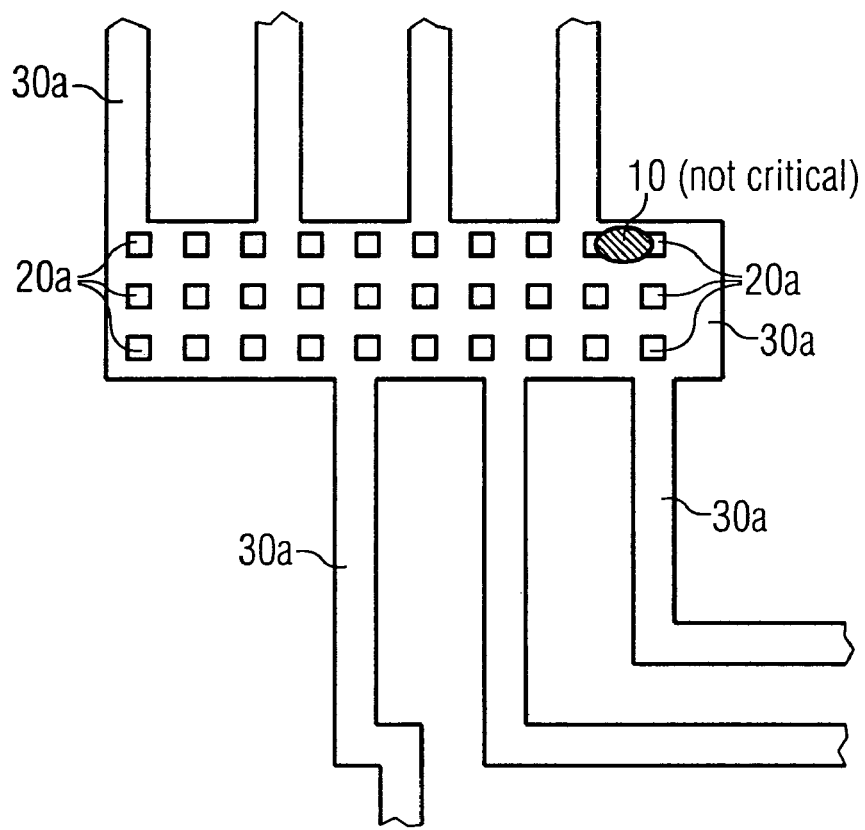
FIG. 12 are two partial views showing a contact area pattern of a first mask level overplotted with a metal line pattern of a second mask level.
Figure 12B:
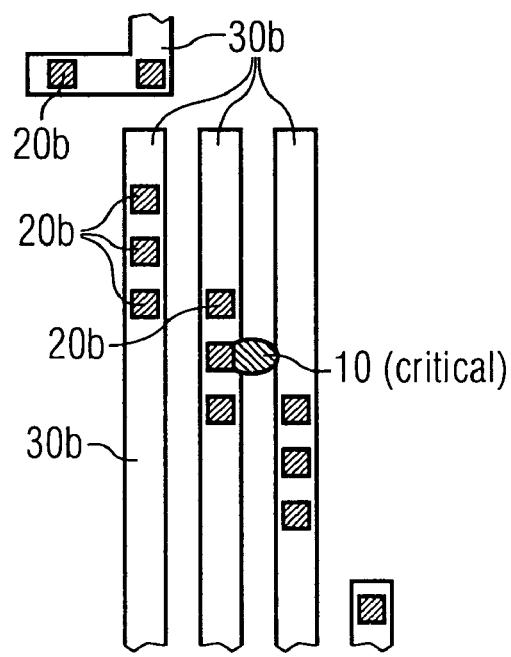

FIGS. 12*a*, 12*b* or 13 show alternative embodiments of how defect inspection sensitivies are attached to different locations (image pixels) within a pattern. In FIG. 12 a contact array pattern 20*a*, 20*b* to be inspected with the present method is shown together with another mask pattern 30*a*, 30*b* corresponding to a metal line or wiring layer, to which each of the contacts are to be connected by means of a lithographic projection transfer with subsequent processing (metal deposition).

As illustrated in FIG. 12*b* a hypothetic defect 10 connects one of the contacts 20*b* of a first pattern with a metal line 30*b* of a second pattern. A short circuit would result in case of actually patterning a wafer with both patterns.

Accordingly, electronic data representations of both patterns (e.g. GDS II-Files) are acquired to determine a condition that in a lithographic projection step no electrical contact is established between metal lines 30*b* of the metal layer. The electrical properties of any electrical component involved are to be evaluated. In the case shown in FIG. 12*b* metal lines 30*b* do not contact each other, such that a hypothetic defect 10 could possibly lead to a damage with respect to an electrical functionality of the corresponding electrical components. A tight tolerance range will therefore be specified for a minimum allowed proximity of contact 20*b* to metal line 30*b* in this embodiment. The sensitivity can be adjusted (increased) by decreasing the pixel size thus enhancing the resolution of the image obtained.

Depending on the ratio of image tool resolution to a defect size a high sensitivity requirement can alternatively be set up by applying a small intensity threshold level to possible defect locations—or pixels—shown in FIG. 12*b*. This becomes valid, e.g., if typical defect sizes become larger than the image pixel resolution.

FIG. 12*a* shows that metal line pattern 30*a* provided with the second mask pattern substantially comprises a large metal pad, to which contacts 20*a* are connecting. A hypothetic defect 10 residing between one of both contacts 20*a* could result in a short between both contacts or on the contrary could result in a non-establishment of one of the contacts in a lithographic step. However, on the one hand any of those contacts 20*a* are already electrically connected by means of the metal pad and on the other hand there are enough contacts 20*a* such that non-establishment of one of the contacts marginally affects the resistance of the contact array. The plurality of contacts 20*a* are provided for guaranteeing a predetermined resistance of a further metal layer (not shown in FIG. 12) to the metal layer 30.

Consequently, the evaluation step of the electrical property leads to a relaxed specification, and thus to a relaxed pixel size—or the second threshold level determined according to the present invention can be ascertained with a larger value than, e.g., that shown in FIG. 12*b*.

The embodiment shown in FIG. 13 shows the case of conductive lines 20*a*, 20*b* located in a layer on a semiconductor wafer above and besides an active area 30. The fundamental electrical property considered here is not an isolation between separate lines from the same or different mask levels, but rather the size of a gate conductor area between the conductive lines 20*a*, 20*b* and the active area 30.

Accordingly, a hypothetical defect 10 would increase such an area. As a consequence the electrical functionality of these components might be deteriorated by defect 10, such that within the location above active area 30 the tolerance range and thus the intensity threshold level are tightened. On the contrary, locations 20*a* of the gate conductor layer are subject to relaxed specifications, and thus, a larger intensity threshold level—or enlarged pixel size—is applied to pixels corresponding to these locations.

There are several methods of how a surface area can be marked for differing defect sensitivities according to the present invention. One method relates to marking specific surface areas of interest in the electronic data files, i.e. the GDSII files. Typically, the layout for one mask level contains one or multiple design layers. Different design layers for structures being on one mask are used for several reasons. As an example, it might be beneficial to distinguish in the design between shapes which are supposed to get OPC (optical proximity correction) or other structures, which are intended to be transfered onto the same mask as is without any further (OPC) modifications. The distinction can be easily done by using two different design layers.

The concept of using different design layers for structures ending up on the very same mask can be adapted such that different design layers are used to associate them with surface areas—or logical zones—which are then associated with inspection rules. E.g. setting a smaller pixel size or a reduced intensity threshold level being a function of defect size.

This design layer concept can either be extended by using marking shapes that will not be printed on a wafer in case of lithographic projection. Advantageously, these shapes can then be placed at any location in the pattern (design) covering the desired surface area and then being associated with a specific inspection rule. The area content of those shapes each defines a logical zone.

Next, design rules (linewidth, contact hole dimensions, minimum proximity to neighboring features) may be applied to a particular position within a pattern. For each position the design rules can be converted into inspection rules. Neighboring positions—or pixels—can be combined to yield logical zones to be stored and retrieved in case a defect is detected.

We claim:

1. A method of inspecting a mask or reticle provided with a pattern to be transferred onto a semiconductor wafer, the pattern having a defect, the method which comprises the steps of:

creating a plurality of logical zones and uniquely associating each of the logical zones with a surface area of the pattern such that each of the plurality of logical zones represents a different defect sensitivity according to structural features of the pattern within the surface area;

associating an inspection rule representing a characteristic sensitivity for detecting a defect with each of the logical zones;

recording an image of the pattern to form a recorded image;

comparing the recorded image with a reference image of an ideal pattern for locating a defect within the pattern;

identifying one of the logical zones with the defect located in the locating step;

retrieving the inspection rule that is associated with the identified logical zone;

applying the inspection rule to a characteristic of the defect for determining whether or not the defect is to be repaired; and issuing a signal in response to the determination.

2. The method according to claim 1, wherein the characteristic of the defect is a size of the defect.

3. The method according to claim 2, wherein the inspection rule includes an intensity threshold level associated with its logical zone; and the step of applying the inspection rule includes comparing the intensity threshold level with an intensity value, which is recorded with the image at the location of the defect and is a function of the size of the defect.

4. The method according to claim 2, wherein the image is a digital image comprising a plurality of pixels, each of the pixels having a pixel size representing a length scale within the pattern on the mask or reticle; and the inspection rule includes a pixel size associated with its logical zone.

5. The method according to claim 4, wherein the step of applying the inspection rule includes an adjustment of the pixel size within a portion of the image corresponding to the logical zone.

6. The method according to claim 1, wherein the characteristic of the defect is a proximity of the defect to a structural feature within the pattern.

7. A method of inspecting a mask or reticle provided with a pattern to be transferred onto a semiconductor wafer, the pattern having a defect, the method which comprises the steps of:

creating a plurality of logical zones and uniquely associating each of the logical zones with a surface area of the pattern, and thereby:

storing and providing an electronic data representation of the pattern, wherein any structural features within the pattern of the mask or reticle are arranged as geometrical shapes in multiple layers; and associating each one of the plurality of logical zones with one of the layers;

associating an inspection rule representing a characteristic sensitivity for detecting a defect with each of the logical zones;

recording an image of the pattern to form a recorded image;

comparing the recorded image with a reference image of an ideal pattern for locating a defect within the pattern;

identifying one of the logical zones with the defect located in the locating step;

retrieving the inspection rule that is associated with the identified logical zone;

applying the inspection rule to a characteristic of the defect for determining whether or not the defect is to be repaired; and issuing a signal in response to the determination.

8. A method of inspecting a mask or reticle provided with a pattern to be transferred onto a semiconductor wafer, the pattern having a defect, the method which comprises the steps of:

creating a plurality of logical zones and uniquely associating each of the logical zones with a surface area of the pattern, and thereby:

storing and providing an electronic data representation of the pattern, wherein any structural features within the pattern of the mask or reticle are arranged as geometrical shapes in multiple layers;

providing at least one additional layer within the electronic data representation, that comprises geometrical shapes, which do not correspond to structural features within the pattern on the mask or reticle; and associating each of the geometrical shapes provided with the additional layer with one of the plurality of the logical zones within the pattern;

associating an inspection rule representing a characteristic sensitivity for detecting a defect with each of the logical zones;

recording an image of the pattern to form a recorded image;

comparing the recorded image with a reference image of an ideal pattern for locating a defect within the pattern;

identifying one of the logical zones with the defect located in the locating step;

retrieving the inspection rule that is associated with the identified logical zone;

applying the inspection rule to a characteristic of the defect for determining whether or not the defect is to be repaired; and issuing a signal in response to the determination.

9. A mask or reticle inspection system, comprising:

a memory device for storing a reference image of a pattern provided with a mask or reticle, a plurality of logical zones, and an inspection rule associated with each of the logical zones, wherein each logical zone represents an area of the pattern and each of the logical zones represents a different defect sensitivity according to structural features of the pattern within the surface area;

an image capture device coupled to said memory device and configured to record an image of the pattern and store the image in said memory device; and a processor coupled to said memory device and configured to compare the image of the pattern to the reference image of the pattern, to locate a defect within the pattern, to apply an inspection rule associated with the logical zone that is identified with the defect to a characteristic of the defect for determining whether or not the defect is critical, and to issue a signal in furtherance of applying the inspection rule.

10. A mask or reticle inspection system, comprising:

a memory device adapted to store a reference image of a pattern provided with a mask or reticle, a plurality of inspection rules representing different defect sensitivities according to structural features of the pattern, and an electronic data representation of the pattern and at least one second pattern;

an image capture device coupled to said memory and adapted to record an image of the pattern and store the image in said memory; and a processor coupled to said memory and adapted to compare the image of the pattern to the reference image of the pattern, locate a defect within said pattern, to compare the pattern with the at least one second pattern, to select and apply an inspection rule selected in response to the comparison of the patterns to a characteristic of the defect for determining whether or not the defect is critical, and to issue a signal in furtherance of applying the inspection rule.

* * * * *